United States Patent [19]

Beha et al.

[11] Patent Number: 5,418,447
[45] Date of Patent: May 23, 1995

[54] PROCESS AND APPARATUS FOR ELECTROMAGNETICALLY LOCATING AND IDENTIFYING ELECTRICAL LINES USING A HIGH FREQUENCY CARRIER WAVE

[75] Inventors: Christian Beha, Glottertal, Germany; Martin Schwarz, Carrigaline, Ireland; Hans-Dieter Schuessele, Malterdingen, Germany

[73] Assignee: Ch. Beha GmbH, Glottertal, Germany

[21] Appl. No.: 827,470

[22] Filed: Jan. 29, 1992

[30] Foreign Application Priority Data

Feb. 2, 1991 [DE] Germany .................. 41 03 234.9

[51] Int. Cl.6 .................. G01R 31/02; G01R 31/302; G01V 3/165
[52] U.S. Cl. .................. 324/67; 324/326
[58] Field of Search .......... 324/66, 67, 326–329, 324/527–529, 555, 556

[56] References Cited

U.S. PATENT DOCUMENTS

| | | | |
|---|---|---|---|
| 3,991,363 | 11/1976 | Lathrop | 324/67 X |
| 4,642,556 | 2/1987 | Pecakenis | 324/67 |
| 4,775,832 | 10/1988 | Pecukonis | 324/67 |
| 4,804,907 | 2/1989 | Pecukonis | 324/67 |
| 4,818,944 | 4/1989 | Rippingale | 324/67 X |
| 5,065,098 | 11/1991 | Salsman et al. | 324/67 X |
| 5,093,622 | 3/1992 | Balkman | 324/67 X |
| 5,264,795 | 11/1993 | Rider | 324/67 X |

FOREIGN PATENT DOCUMENTS

| | | |
|---|---|---|
| 3110820 | 1/1982 | Germany . |
| 3216263 | 11/1983 | Germany . |
| 3623045 | 1/1988 | Germany . |
| 3623588 | 1/1988 | Germany . |
| 3708968 | 10/1988 | Germany . |

*Primary Examiner*—Gerard R. Strecker
*Assistant Examiner*—Warren S. Edmonds
*Attorney, Agent, or Firm*—Haynes N. Johnson

[57] ABSTRACT

A process and apparatus for locating and identifying electrical lines in which a high frequency carrier wave, modulated with a four-bit, serial binary code, is transmitted down the line. An electro-magnetic detector is used to locate the particular line bearing this modulated wave, permitting identification of the line without having to make actual electrical contact with the line at the point of identification.

13 Claims, 2 Drawing Sheets

PROCESS AND APPARATUS FOR ELECTROMAGNETICALLY LOCATING AND IDENTIFYING ELECTRICAL LINES USING A HIGH FREQUENCY CARRIER WAVE

The invention relates to a process for the contactless locating and identifying of electrical lines, and to a cable locator for carrying out said process.

For the contactless locating of electrical lines or cables, cable locators are known which have an electric oscillating circuit. When the line or cable locator comes close to a metallic object, the oscillating circuit becomes mistuned, which is exploited for the indication. Such locator devices have little sensitivity. In addition, such devices respond to any metallic object, i.e., not only to electrical cables, and they are not suitable for the identification of lines, i.e., for distinguishing between different electrical lines.

Furthermore, cable locators are known which have an emitter which is connected to the line to be located and supplies the latter with a high-frequency current. With a receiver tuned to the frequency of the emitter, the line is located by means of the electromagnetic field radiated by such line. The high-frequency signal can be transmitted to other lines by the line to which it is supplied, and it can be dispersed within the installation system, or interfered with by other sources of interference and their harmonics. This leads to faulty readings and impairs the response of the device.

The invention is based on the problem of making available a process and a device permitting an exact and sensitive localization of electrical lines and their identification.

Advantageous embodiments of the invention are defined in the dependent claims.

According to the invention, the lines to be located and to be identified are supplied with a high-frequency current by means of an emitter, said current being gated according to a serial digital coding. Based on a predetermined code pattern, current pulses are thus supplied to the lines having the carrier frequency. For locating the lines, a receiver is used of which the input receiving circuit is tuned to the carrier frequency. The carrier frequency signals received by the receiver, said signals being modulated according to the coding, are demodulated in the receiver, so that the serial digital coding is obtained. Thus, there is no electrical contact between the cable to be located and the receiver, i.e., it is "contactless." "Contactless" means that no electrical contact permitting electrical conduction is required, but does not necessarily mean that there is no physical contact.

The coded modulation (gating) of the carrier frequency results in high sensitivity and nonsusceptibility of the line location to interference. The high frequency supplied to the lines is not used for line locating itself, but only serves as the carrier frequency for transmitting the coded information. Selected and indicated is the information coded according to a defined code. Hence interferences of the carrier frequency caused by other sources of interference and the like have no bearing on the locating of the line. The digitally coded information permits an exact locating of the line even with an unfavorable signal/noise ratio.

In addition, the coded modulation of the carrier frequency permits a simple line identification. For this purpose, the carrier frequency is supplied to the various lines in each case modulated according to a different coded value. Hence the receiver passed along a line locates such line not only based on the received field intensity of the carrier frequency but, following corresponding decoding, indicates the respective values, i.e. the number of the line, also digitally.

In an advantageous embodiment, the emitter connected to the line to be located and identified can receive its supply voltage from such line if the latter is live. So that it is possible also to locate a dead line, the emitter is additionally equipped with a battery which, in this case, supplies the supply voltage.

The high-frequency generator generating the carrier frequency is preferably reversible between different carrier frequencies, so that the latter can be optimally adapted to the transmitting medium (e.g. wall of a building, earth etc.) in which the line is installed.

The line locator according to the invention can be used in both a closed power circuit and an open power circuit of the line to be located.

The decoder of the receiver supplies the code value of the located line digitally to the indication. If the decoder can not detect a complete signal, it preferably supplies an error indication.

Furthermore, in a preferred embodiment, testing of the battery supplying the supply voltage can be carried out in both the emitter and the receiver. If the voltage of the battery falls below a predetermined value, such drop is indicated on the receiver.

So as to permit rapid and easy locating of the lines, provision is made on the receiver for, preferably, optical and/or sound indications of the field intensity.

The invention is explained in greater in the following by reference to an exemplified embodiment shown in the drawing, in which.

Figure 1:
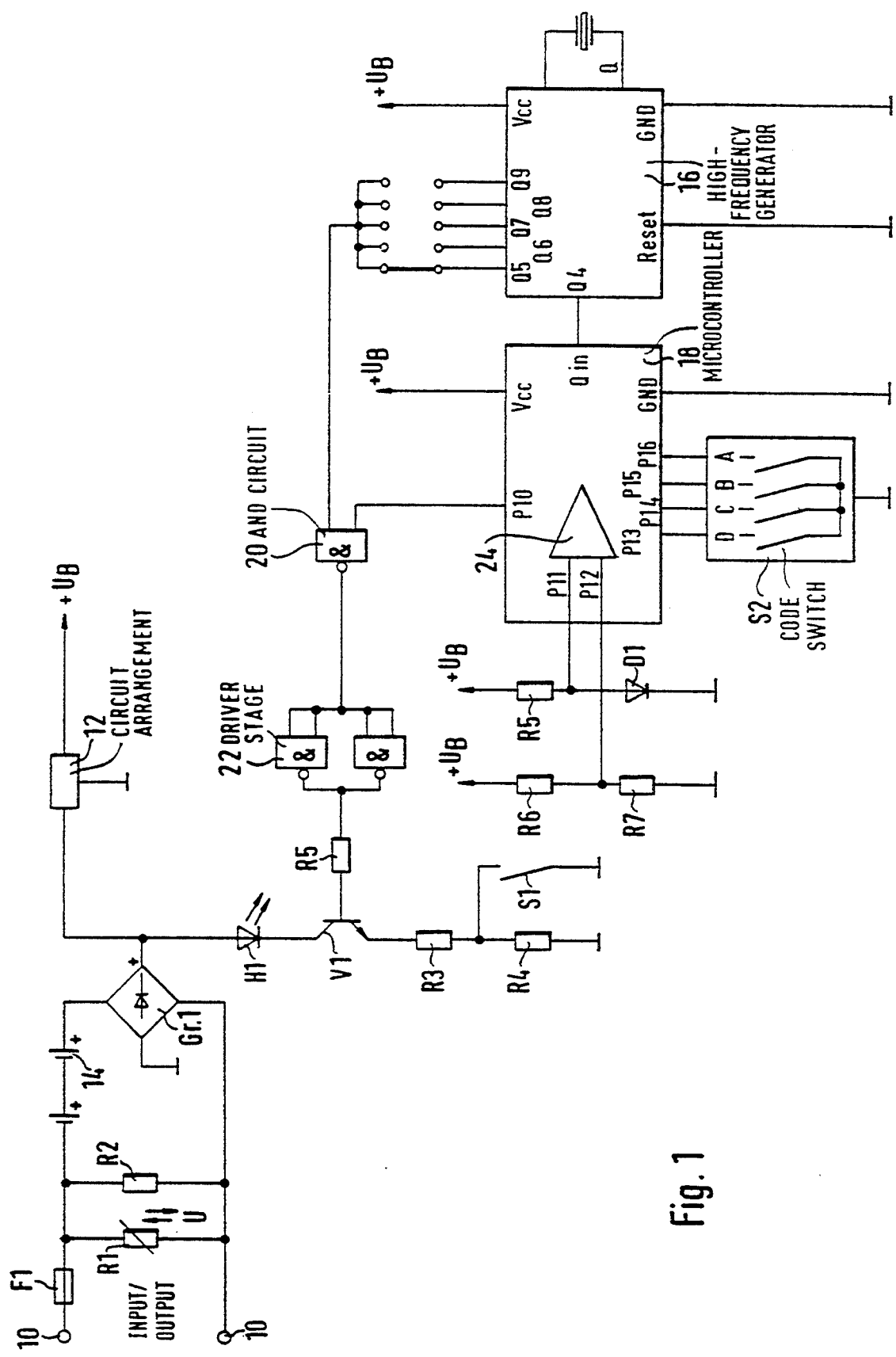
FIG. 1 shows a circuit diagram of the emitter of the line locator.

In order to locate electrical lines installed outdoors, under plaster or in the ground (soil), the emitter shown in FIG. 1 is connected with its input terminals 10, on the one hand, to the line, whose course is to be located, and on the other hand to earth potential. A fuse F1 protects the emitter circuit against excessive currents. Furthermore, the input terminals 10 are bridged by a cold lead resistor R1 and an ohmic resistor R2, serving as excess voltage protection.

If the injected voltage of a line to be located is applied to the input terminals 10, such injected voltage is used for supplying the emitter with voltage. For this purpose, the injected voltage is carried via a rectifier Gr1 in the form of a Graetz (bridge) rectifier. The internal, stabilized supply voltage $+U_B$ for the emitter is obtained from the rectified voltage via a circuit arrangement 12, which is known per se. Voltage stabilization can be provided, as shown, for example, in the book "Electronik ohne Ballast," 1971, at page 204. It can be achieved by rectifying an ac voltage, filtering it with capacitors and resistors across the line, and using a Zener diode across the line. For the voltage supply, dc or ac voltages of up to 440 volts can be used on the input terminals 10.

If the input terminals 10 are connected to a dead line, the supply voltage $+U_B$ is supplied by the batteries 14. These batteries 14, which are interconnected in series between the input terminals 10 and the rectifier Gr1, will automatically supply the voltage if the input terminals 10 are connected to dead lines. This means that the emitter automatically reverses between an injected voltage supply and an internal battery supply.

The emitter has a high-frequency generator with a frequency divider 16 generating a carrier frequency. Said carrier frequency can be reversibly tapped from the outputs $Q_5$ to $Q_9$ of the high-frequency generator in order to be able to select the carrier frequency that is most favorable for the transmitting medium in which the line to be located is installed.

The highest frequency of the high-frequency generator 16 is fed from its output $Q_4$ to a microcontroller 18 in order to fix the processor cycle of the latter.

A code switch S2 permits inputting of a coded four-bit value in the microcontroller 18 via the inputs P13 to P16. The coded value entered via the code switch S2 is applied to an output P10 of the microcontroller 18 as a serial binary modulation signal.

In an AND-circuit 20, the selected carrier frequency coming from the high-frequency generator 16 is logically linked with the coded serial modulation signal coming from the microcontroller 18, so that a digitally coded sequence of pulses of the carrier frequency is obtained. Said pulse sequence is applied to the base of a control transistor V1 via a driver stage 22 and via a resistor R5.

The emitter of the control transistor V1 is connected to the plus pole of the rectifier circuit Gr1 via a light-emitting diode H1, the latter being poled in the forward direction. The emitter of the control transistor V1 is connected to earth potential via a series connection of the ohmic resistors R3 and R4. The resistor R4, which is connected to earth potential, can be bridged by a switch S1.

When the input terminal 10 (which is the top terminal in the drawing) is clamped to the line to be located and the lower (in the drawing) input terminal 10 is applied to earth potential, a closed current circuit is obtained via the line to be located, the input terminal 10, the batteries 14, the rectifier circuit Gr1, the light-emitting diode H1, the control transistor V1, and the resistors R3 and R4. The current flowing in said circuit is controlled by the control transistor V1 according to the modulated carrier frequency, such modulation being coded. In this process, the light-emitting diode H1 indicates that the emitter is in operation. This means that the line to be tested is supplied with a high-frequency current with modulated pulses, such current generating within the environment of said line a corresponding electro-magnetic field.

By closing the switch S1, the resistor R4 can be bridged. In this way, the modulation current can be increased in order to adapt such current to the line system to be tested.

A voltage comparator 24 is installed in the microcontroller 18. A reference voltage is applied to the input P11 of said comparator 24, said reference voltage being generated from an ohmic resistor R8 and a diode D1 by a voltage divider disposed between the supply voltage $+U_B$ and the earth potential. A voltage proportional to the supply voltage $+U_B$ is applied to the second input P12 of the comparator 24, said voltage being generated from the ohmic resistors R6 and R7 by a voltage divider disposed between the supply voltage $+U_B$ and the earth potential. If the comparator 24 indicates a drop in the supply voltage $+U_B$ due to any weakening of the batteries 14, the microcontroller 18 will output at its output P10 no longer the code signal adjusted via the code switch S2, but another code signal indicating the drop in the supply voltage.

Figure 2:
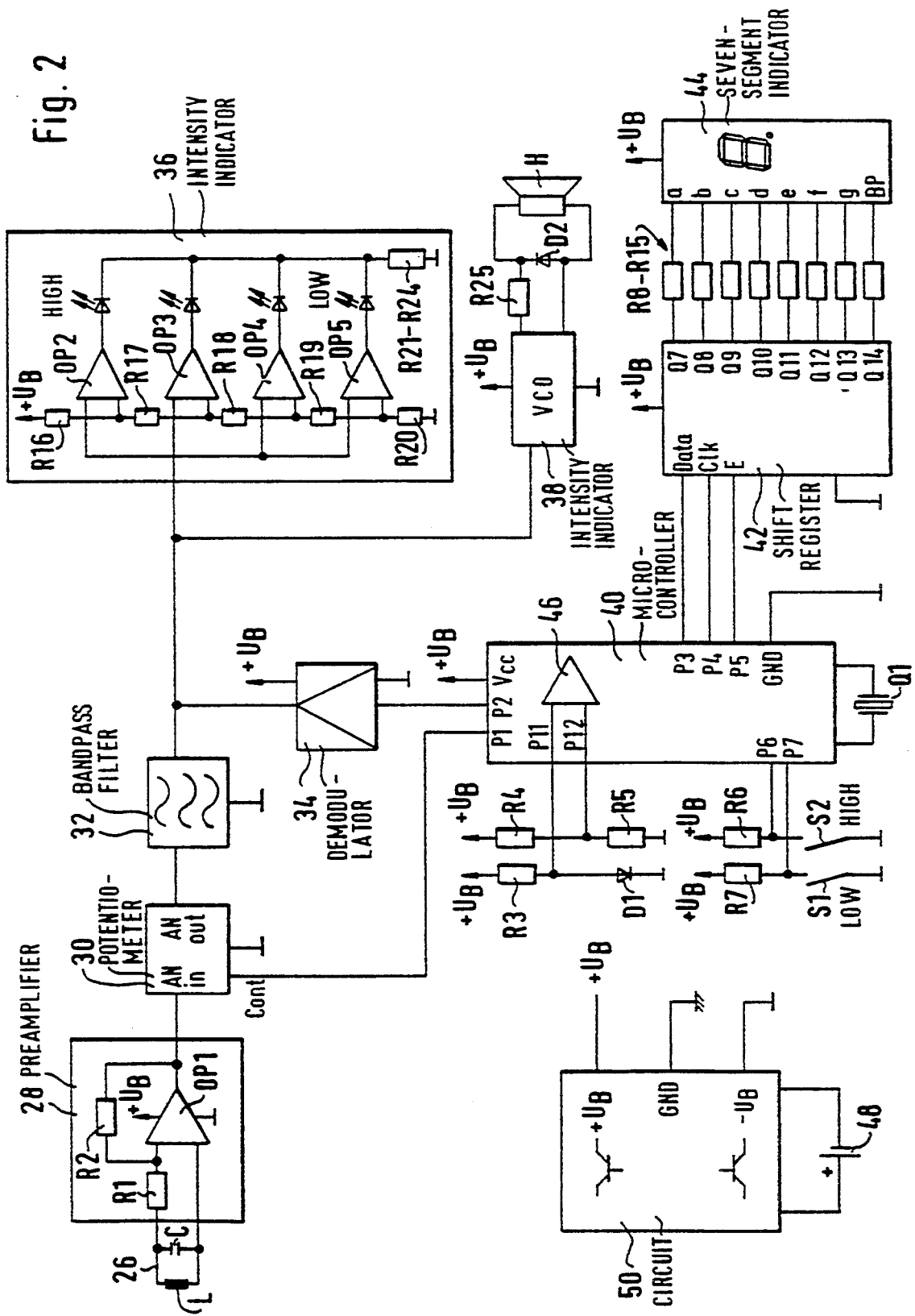
FIG. 2 shows a circuit diagram of the receiver.

The receiver shown in FIG. 2 is accommodated in a hand-held device serving for locating the lines marked by means of the emitter shown in FIG. 1.

The receiver has a receiving circuit 26 in the form of a parallel resonant circuit with an inductivity L and a capacity C. Said receiving circuit 26 is tuned to the carrier frequency of the emitter, said frequency being predetermined by the high-frequency generator 16. In the presence of resonance, said receiving circuit 26 has its maximum resistance and maximum-voltage. The voltage of the receiving circuit 26 is amplified by way of a preamplifier 28 comprised of an operation amplifier OP1 and the ohmic resistors R1 and R2. The output signal of the preamplifier 28 is supplied to the input of a digital potentiometer 30, which reduces or increases the amplitude at the analog output in accordance with the pulse-pause ratio applied to the control input in order to optimally adjust the response of the receiver. The output signal of the digital potentiometer 30, said signal being so controllable with respect to its amplitude, is passed via an active bandpass filter 32, which ensures that only the carrier frequency portions of said signal are supplied to a demodulator 34, an optical field intensity indicator 36, and to an acoustic field intensity indicator 38.

The optical field intensity indicator 36 has four voltage comparators OP2 to OP5, which are supplied with the signal, on the one hand, and with comparative voltages on the other hand, such comparative voltage being scaled in steps in each case and tapped from the ohmic resistors R16 to R20 by a voltage divider. The field intensity indicator 36 sorts in this way the signal coming from the bandpass filter 32 in four orders of magnitude, such sorting being carried out by amplitude, and indicates the respective order of amplitude by means of the light-emitting diodes connected downstream of each of the comparators OP2 to OP5. By means of the optical field intensity indicator 36, the receiver with its receiving circuit 26 can be positioned in such a way that the maximum field intensity of the electromagnetic field is received, the latter being radiated by the line marked by the emitter of FIG. 1. In this way, the optical field intensity indication 36 permits locating of the marked line.

The acoustic field intensity indication 38 is connected parallel with the optical field intensity indication 36. By means of a voltage-controlled oscillator VCO, said acoustic field intensity indication generates an acoustic signal conforming to the amplitude of the signal coming from the bandpass filter 32. Said acoustic signal is supplied to a loudspeaker H by way of a resistor R25 and, in this way, made audible. In this way, the marked line can be located also via the acoustic field intensity indicator 38.

The demodulator 34 separates the pulse-like, digitally coded modulation signal from the signal of the carrier frequency. The digitally coded modulation signal is supplied to the input P2 of a microcontroller 40. The latter decodes the signals received at input P2 and tests said signals for their correctness. The correct signals are converted into the emitted code value and indicated. For this purpose, the digitally coded values are issued serially to a shift register 42 by way of the outputs P3 to P5, which shift register controls a seven-segment indicator 44 by way of its outputs Q7 to Q14, Incorrect or incomplete code values (caused, for example, by interferences) are not recognized by the microcontroller 40, and such incorrect or incomplete code values are shown by the latter, for example by an error indication. The processor cycle frequency generated by an oscillator Q1 is applied to the inputs CLK1 and CLK2 of the microcontroller 14. Different voltages can be applied to the inputs P6 and P7 of the microcontroller 40 by means of the two keys S1 and S2 by way of the resistors R7 and R6, respectively. In this way, it is possible to change the pulse-pause ratio at the output P1 and thereby the adjustment of the amplification of the digital potentiometer 30. The key S1 causes a change of the pulse-pause ratio in the direction of 100% pulse (lowest amplification of the digital potentiometer 30), whereas actuating of the key S2 effects a change in the pulse-pause ratio in the direction of 100% pause (highest amplification of the digital potentiometer 30). With each actuation of the key S1 or S2, the response of the receiver adjusted at the given moment, i.e., the amplification of the digital potentiometer 30 in the seven-segment indicator 44, is briefly faded in as one of the numbers from 0 to 9.

The microcontroller 40, too, has a comparator 46. A reference voltage is applied to the input P11 of said comparator, said reference voltage being fixed by a diode D1 connected in series with an ohmic resistor R3. A voltage proportional to the supply voltage $+U_B$, said voltage being determined by the series connection of two ohmic resistors R4 and R5, is applied to the input P12. The required stabilizing supply voltage $+U_B$ is generated from the voltage of a battery 48 by means of a circuit 50. When the comparator 46 detects a drop in the supply voltage $+U_B$, such drop is indicated by the seven-segment indicator 44.

The emitter shown in FIG. 1 is connected to a line to be located with respect to its course. If a number of lines have to be located and identified, an emitter according to FIG. 1 is connected to each of said lines, and each of said lines is supplied with a different code value by way of the emitter associated therewith. The receiver is brought close to the covered line by means of the optical field intensity indicator 36 or the acoustic field intensity indicator 38, and said field intensity indicators 36 or 38 permit exact locating of the line. The coded value of the located line is determined via the demodulator 34 and the microcontroller 40 and digitally indicated in the seven-segment indication 44. In this way, it is possible to find out the course of the lines, and the latter can be identified via the seven-segment indicator 44. With the shown embodiment with a four-bit code value, it is possible to maximally mark sixteen lines parallel in multiple ducts or channels and to locate and identify the cable lines.

If the receiver receives interfering signals, such signals can not be decoded by the microcontroller 40, and the latter will transmit to the seven-segment indicator 44 an error indication, e.g. in the form of "—". If the comparator 24 of the microcontroller 18 of the emitter detects any drop in the battery voltage of the emitter, said comparator supplies the line with a low-battery signal, which is decoded by the microcontroller 40 of the receiver and indicated in the seven-segment indicator 44, for example in the form of an "L". Any drop in the voltage of the battery 48 of the receiver is detected by the comparator 46 and indicated in the seven-segment indicator 44 via the microcontroller 40, for example by a flashing decimal point.

If the line to be located is a component of a closed loop of cables, the current flows from the emitter via the line to be marked, and via the internal resistor of the voltage generator of the cable network back to the emitter. In addition to such two-pole line selection it is possible also to locate an interrupted line with only a one-pole connection, i.e., a line not forming a closed current circuit. In this case, the low-impedance PTC resistor R1 forms a simulation of the closed conductor loop for the emitter. The interrupted line connected to the input terminal is connected via the capacitive coupling of said line to the receiver, and via the capacitive coupling of the receiver for the user to the ground (earth) for the high-frequency carrier frequency, to form a closed circuit with the second grounded input terminal 10.

We claim:

1. A cable locator for the contactless locating and identifying of an electrical line, including an emitter connectable to said line, said emitter receiving an injected voltage from said line and as a supply of power including a generator for generating a carrier frequency, and a modulation stage associated with said generator providing serial digital, coded gating of said carrier frequency said modulation stage modulating the carrier frequency according to said coded gating, said serial digital, coded gating providing a distinct, serially-coded pulse signal to said line, and a receiver including a receiving circuit tuned to said carrier frequency for receiving said carrier frequency from said line, a demodulator for demodulating said carrier frequency, and means for providing a digital indication of said serial digital coded gating, whereby a said line can be individually identified by said serially-coded gating, said emitter also including a power supply coupled to said emitter to supply power automatically to said emitter in the absence of current on said line.

2. A cable locator according to claim 1, wherein said means gives an optical field intensity indication.

3. A cable locator as defined in claim 2 wherein said last-named means is acoustic.

4. A cable locator as defined in claim 3 wherein said emitter has a microcontroller converting a selected code entered with digital coding into said serially-coded pulse signal.

5. A cable locator as defined in claim 4, wherein the carrier frequency of said generator and the serially coded gating signal of the microcontroller jointly feed an AND-circuit for modulating said carrier frequency.

6. A cable locator as defined in claim 1, wherein the carrier frequency supplied to said line is controlled by a control transistor controlled by said gated carrier frequency.

7. A cable locator as defined in claim 1, wherein the input of said emitter is bridged by a low-impedance PTC resistor.

8. A cable locator as defined in claim 1, wherein said means for providing a digital indication includes a microcomputer for decoding demodulated signals.

9. A cable locator as defined in claim 8, wherein said means for providing a digital indication includes a seven-segment indicator controlled by said microcomputer.

10. A cable locator as defined in claim 1, including means for amplifying the output of said receiver, said last-named means being adjustable.

11. A cable locator as defined in claim 10, wherein the voltage signal of said receiving circuit is passed by a digital potentiometer, the amplification of the latter being adjustable.

12. A cable locator as defined in claim 1 including means for comparing input voltage to said receiver with a reference voltage wherein a drop in the input voltage is indicated.

13. A process for the contactless locating and identifying of an electrical line, including the steps of supplying a carrier frequency to said line by an emitter, said carrier frequency being gated to provide a serial digital, coded pulse signal to said line thereby radiating an electromagnetic field, receiving the electromagnetic field radiated by said line to be located, using demodulating and decoding means for demodulating and decoding the received electromagnetic field signal to produce a decoded signal, comparing said decoded signal with said coded pulse signal to establish the location and identification of said line, and using a rectified power supply coupled to said electrical line to supply power automatically to said emitter in the absence of current on said line, whereby said line can be individually identified whether or not a current is flowing therein.

* * * * *